UNITED STATES PATENT OFFICE.

JASPER E. CRANE, OF NEWARK, NEW JERSEY, ASSIGNOR TO THE ARLINGTON COMPANY, OF ARLINGTON, NEW JERSEY, A CORPORATION OF NEW JERSEY.

PROCESS OF PURIFYING CAMPHOR.

1,308,398.    Specification of Letters Patent.    Patented July 1, 1919.

No Drawing.    Application filed May 26, 1916. Serial No. 100,152.

*To all whom it may concern:*

Be it known that I, JASPER E. CRANE, of Newark, in the county of Essex, and in the State of New Jersey, have invented a certain new and useful Improvement in Processes of Purifying Camphor, and do hereby declare that the following is a full, clear, and exact description thereof.

The object of my invention is to obtain a purified camphor. Crude camphor contains as impurities camphor oil, resinous impurities, water and dirt.

It is the object of my invention to remove these impurities substantially entirely and in a most expeditious and economical manner. The object is particularly, however, to remove the camphor oil.

While my invention is capable of embodiment in many different forms, for the purpose of illustration I shall describe only one of the many ways in which my invention may be carried out.

According to my invention the camphor to be purified is subjected to a heating operation which has the effect of changing the character of the camphor oil so as to permit it to be readily separated from the camphor. Afterward the camphor may be purified in any suitable manner to remove the impurities.

As one example of carrying out my invention, crude or impure camphor is heated in a securely closed vessel or retort, at a temperature of 300° to 500° F. for preferably about 30 minutes to 1½ hours. The organic impurities such as camphor oil and resinous matters will now be found to have become modified into either non-volatile substances or substances having a different volatility than camphor or both. The substances thus formed are furthermore not soluble in the ordinary organic solvents. The camphor itself is not decomposed nor is it altered chemically to an appreciable degree at the above temperatures.

The heated product now comprises camphor, decomposed oil and other decomposed organic impurities, water and dirt. By introducing lime or some other water absorbing material into the retort, the water may be taken up during the heating of the camphor.

Purified camphor can be obtained from this heated product according to any desired method. For example, the heated product can be purified by solution in naphtha, separation from the layer of water, filtration, distillation to separate the solvent and crystallization.

In the purification of the camphor the heated product may be dissolved in an organic solvent, such as ethyl alcohol, naphtha, etc., so as to produce either a hot supersaturated solution so that on cooling the camphor will crystallize out, or an unsaturated solution which will later be concentrated by distillation. If a solvent which is not miscible with water has been used, the water may now be separated by allowing the solution to stand and drawing off the water from the bottom.

The solution can now be filtered through cloth or any other filtering medium to remove the dirt and insoluble materials. If the solution has a yellow color, which is apt to be the case, this may be removed by filtering it, preferably while hot, through boneblack.

The super-saturated solution, either made so in a hot solvent in the first instance, or made by distilling off a portion of the solvent, is cooled in suitable pans whereupon the pure camphor crystallizes out and is dried by draining in a cloth strainer or by treatment in a centrifugal machine.

Instead of purifying in this way, the retort in which the camphor has been heated may be opened so as to allow the heat to drive off the camphor vapor which is subsequently condensed thus distilling or subliming from a retort and condensing in any suitable manner, as for example, in a sealed chamber.

While I have described my invention above in detail, I wish it to be understood that many changes may be made therein without departing from the spirit of my invention.

I claim:—

1. A process which comprises heating camphor containing camphor oil for a sufficient length of time to change the camphor oil into a product more amenable to separation from the camphor than is camphor oil.

2. A process which comprises heating camphor containing camphor oil for a sufficient length of time to change the camphor oil into a product having a different volatility from the camphor.

3. A process which comprises heating camphor containing camphor oil to a temperature between 300 and 500° F. a sufficient length of time to change the camphor oil into a product more amenable to separation from the camphor than is camphor oil.

4. A process which comprises heating impure camphor to a temperature between 300 and 500° F. a sufficient length of time to change the camphor oil into a product not readily soluble in the ordinary organic solvents and having a different volatility from the camphor.

5. A process which comprises heating impure camphor to a temperature between 300 and 500° F. in a closed chamber so as to modify the characteristics of the camphor oil contained therein.

6. A process which comprises heating camphor containing camphor oil to a temperature between 300° and 500° F. in a closed chamber for a sufficient length of time to change the camphor oil into a product not readily soluble in the ordinary organic solvents and having a different volatility from the camphor.

7. A process which comprises heating impure camphor containing camphor oil to change the camphor oil into a product having solubilities different from those of camphor oil, and then separating the camphor from said product.

8. A process which comprises heating impure camphor to a temperature between 300° and 500° F. so as to modify the characteristics of the camphor oil contained therein, and then separating the camphor from the modified camphor oil.

9. A process which comprises heating camphor containing camphor oil to a temperature between 300° and 500 F. so as to change the camphor oil into a product not readily soluble in the ordinary organic solvents and having a different volatility from the camphor, and then separating the camphor from said product.

10. A process which comprises heating impure camphor to a temperature between 300° and 500° F. in a closed chamber so as to modify the characteristics of the camphor oil contained therein, and then separating the camphor from the modified camphor oil.

11. A process which comprises heating impure camphor to a temperature between 300° and 500° F. in a closed chamber for a sufficient length of time to change the camphor oil into a product not readily soluble in the ordinary organic solvents and having a different volatility from the camphor, and then separating the camphor from said product.

12. A process which comprises heating impure camphor containing camphor oil to change the camphor oil into a product which is less soluble in a camphor-solvent than is camphor oil, and then separating the camphor from said product by dissolving the camphor in a suitable camphor-solvent, and recrystallizing the camphor.

13. A process which comprises heating impure camphor containing camphor oil for a sufficient length of time to change the camphor oil into a product not readily soluble in the ordinary organic solvents and having a different volatility from the camphor, and then separating the camphor from said product and other impurities by solution in naphtha, and recrystallization.

14. A process which comprises heating impure camphor to a temperature between 300° and 500° F. so as to modify the characteristics of the camphor oil contained therein, and then separating the camphor from the modified camphor oil and other impurities by solution in naphtha, and recrystallization.

15. A process which comprises heating impure camphor containing camphor oil to a temperature between 300° and 500° F. for a sufficient length of time to change the camphor oil into a product not readily soluble in the ordinary organic solvents and having a different volatility from the camphor, and then separating the camphor from said product and other impurities by solution in a suitable camphor solvent and recrystallization.

16. A process which comprises heating impure camphor to a temperature between 300° and 500° F. in a closed chamber so as to modify the characteristics of the camphor oil contained therein, and then separating the camphor from the modified camphor oil and other impurities by solution in naphtha, and recrystallization.

17. A process which comprises heating impure camphor containing camphor oil to a temperature between 300° and 500° F. in a closed chamber for a sufficient length of time to change the camphor oil into a product not readily soluble in the ordinary organic solvents and having a different volatility from the camphor, and then separating the camphor from said product and other impurities by solution in a suitable camphor solvent and recrystallization.

18. A process which comprises heating impure camphor containing camphor oil to a temperature between 300° and 500° F. in a closed chamber for a sufficient length of time to change the camphor oil into a product not readily soluble in the ordinary organic solvents, and then separating the camphor from said product and other impurities by dissolving the camphor in naphtha, filtering the solution, and recrystallizing the camphor from the filtered solution.

In testimony that I claim the foregoing I have hereunto set my hand.

JASPER E. CRANE.

Witnesses:
J. M. KESSLER,
LEON G. CORNIER.